United States Patent Office 2,727,846
Patented Dec. 20, 1955

2,727,846

SILOXANE-CONTAINING DRESSING

Richard L. Talbot, Oshkosh, Wis., assignor to The Silicote Corporation, Oshkosh, Wis., a corporation of Wisconsin No Drawing. Application August 22, 1951,
Serial No. 243,177

7 Claims. (Cl. 167—63)

This invention relates to improved salves, ointments and other medical dressings and more particularly to such medical dressings containing siloxane compositions.

This application is a continuation-in-part of my copending applications Serial Nos. 91,007, filed May 2, 1949, and 72,739, filed January 25, 1949, both now abandoned.

In the treatment of human and animal skin injuries or management of other dermatological conditions, the rapidity of recovery depends in large measure on the effective protection of the affected areas from the harmful effects of moisture, air and irritating abrasions produced by clothing or adjacent parts of the body. The present invention provides improved protectants for damaged, cut or infected areas of the skin against such factors.

Such a protectant must be stable and of low toxicity and should be chemically inert with respect to water, skin and most substances so that it may be freely and safely applied to damaged areas of the skin alone or together with the usual medicants.

Since in many types of skin injuries such as burns the dressing must protect against the sequelae of constant moisture, it must provide an effective adherent moisture barrier. The dressing should be inert to urine, perspiration and other body discharges so as to be used as a diaper rash preventative and for like purposes. In the treatment of colostomies and similar conditions of the skin, the dressing must afford complete protection against strong stomach acids. The dressing should also possess sufficient lubricity to avoid frictional irritation and at the same time have sufficient viscosity to properly adhere to the skin. The lubricity and viscosity of course should preferably be reasonably constant throughout the range of temperatures to which the skin may be exposed.

While one or more of these requirements may be found in various salves and ointments on the market, I known of none which can satisfy all of them. Most of these prior salves and ointments rely on lanolin and other vegetable or animal fats that deteriorate with age.

It is accordingly the primary object of the invention to provide an improved skin protecting dressing which satisfy all of the above requirements and provide a highly effective treatment for a practically unlimited range of dermatological conditions.

It is a further object of the invention to provide a novel skin protecting dressing comprising a siloxane composition of suitable viscosity homogeneously admixed with a suitable inert non-toxic vehicle.

Further objects and advantages of my improved skin protecting dressing together with the manner in which the objects of the invention are obtained will become apparent as the following description proceeds.

In the invention I mix a siloxane with a major amount of an inert and non-toxic vehicle.

A siloxane is one of a group of compounds having a characteristic silicon-oxygen-silicon linkage. Its composition is known and explained in literature such as Chemistry of the Silicones by Eugene G. Rochow. The structural formula for these compounds is:

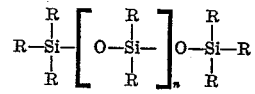

where $R$ = a hydrocarbon radical such as methyl ($CH_3$), and
$n$ = an integer.

These siloxanes may be obtained in viscosities ranging from liquids, sometimes called oils, through plastic states, sometimes called greases, and up to solid state, depending upon the extent of polymerization.

For purposes of the invention, the preferred siloxanes are methyl siloxanes, ethyl siloxanes and phenyl siloxanes. These are characterized by chemical inertness, stability against changes in viscosity or state upon changes in temperature encountered normally in medical treatments, and ability to repel moisture. The property of thermal stability would render them superior to animal and vegetable fats even if all else were equal. These siloxanes accordingly, are extremely useful as ingredients of skin protecting dressings where, as is usually the case, effective protection against the sequelae of constant moisture is of primary importance.

Actual medical experience has shown the effectiveness of these siloxanes in this connection to a remarkable degree. Further by laboratory studies have indicated that these siloxanes have remarkably low toxicity. It has been demonstrated by actual tests that these siloxanes have little or no untoward reaction when administered by mouth up to two per cent of body weight, inhaled in proportions as high as four thousand parts per million, or when applied directly upon large areas of the skin.

It has also been found that these siloxanes have an extremely small temperature coefficient of viscosity and that the viscosity actually remains practically unchanged within the range of temperatures to which the animal body may be exposed. The methyl, ethyl or phenyl siloxanes are preferably prepared in paste or grease form and will remain in this condition and will not run or smear and will retain their initial lubricity within expected temperature ranges. It has been found that the desirable properties of these siloxanes can be retained and the cost of the dressings substantially decreased by mixing the siloxanes homogeneously with a suitable vehicle such as petrolatum, sterile jelly, commercial "Aquaphor," Unguent Aquae Rosae, "Jelene" and similar plastic non-toxic substances. "Aquaphor" consists of 6% cholesterol and its esters in admixture with 94% petrolatum. The cholesterol-bearing component is obtained from wool fat, and is also known as eucerin. See Remington's Practice of Pharmacy, 10th edition, chapter 21, p. 191 (1951), published by Mack Publishing Co., Easton, Pa. The same information also appears in the 1948 edition, published by J. B. Lippincott Co., Philadelphia, Pa. Also see Dr. Eugen Unna, "Ointment Bases," Journal of the American Pharmaceutical Association, vol. 1, p. 673 (1912). "Jelene" is a combination of mineral oils and heavy hydrocarbon waxes, having a molecular weight of approximately 1,300, and is more fully described by Foster et al. in the Journal of the American Pharmaceutical Association, Sc. Ed., vol. 40, March 1951, pgs. 123–125. Of all the vehicles mentioned hereinabove, petrolatum is preferred because of its adherent properties. The relative proportions of the siloxanes and the vehicle is usually determined by the type of skin condition to be treated.

In the treatment of skin conditions such as eczema, mild sunburn, etc. particularly on surfaces of the human body which it is not practical to cover with bandages and the treatment of which does not require the maximum degree of protection possible, the following composition is most practical:

Formula 1

8 per cent methyl or phenyl siloxane by volume,
92 per cent petrolatum or equivalent vehicle by volume.

It has been determined that the siloxane content of this composition may vary from three to twelve per cent depending upon the severity of the skin injury. While the viscosity of these siloxanes is not critical medically, it has been found that the preferred range is from 20 centistokes to 500 centistokes at 25° C. At viscosities below 20 centistokes, the siloxanes tend to lose some of their stability and cannot be considered non-volatile. On the other hand, while siloxanes having viscosities above 500 centistokes may be utilized, it has been found that the slightly increased effectiveness of the heavier siloxanes does not offset the practical difficulty in obtaining a homogeneous mixture and that the mixture tends to become sticky and less pleasant to handle.

In applications such as colostomies where the skin surface must be protected from strong stomach acids, the use of a mixture having greater siloxane content is preferable. A typical compound in this group is as follows:

Formula 2

25 per cent methyl or phenyl siloxane by volume,
75 per cent petrolatum or equivalent vehicle by volume.

Here again the siloxane content may vary. As little as 12 per cent may be used in this class, for example, in treating such injuries as second degree burns and where adequate protection for delicate membranes is necessary, within the practical limitations of cost. When the siloxane content exceeds forty-five per cent it becomes difficult to obtain a homogeneous mixture and the slightly increased effectiveness of the salve is offset by this factor as well as the increased cost.

In the treatment of aggravated conditions of colostomies, hemorrhoids, first degree burns, etc. it is desirable to use the heavier viscosity siloxanes with the addition of a lighter siloxane which will "bleed" to the surface of the salve after application thus increasing its effectiveness as a water repellant agent. A typical formula in this group is as follows:

Formula 3

5 per cent methyl or phenyl siloxanes by volume—350 centistokes,
20 per cent methyl or phenyl siloxanes by volume—60,000 centistokes,
75 per cent petrolatum or equivalent vehicle by volume.

Again the viscosity is a matter of selection depending upon the specific application as is the siloxane content which, as in Formula 2 may vary within the practical limits of 8 to 45 per cent.

A formula specifically developed for first degree burns is as follows:

Formula 4

10 per cent methyl or phenyl siloxanes by volume—60,000 centistokes,
15 per cent by volume methyl or phenyl silicone greases formed by adding powdered silica or other non-toxic thickening agents to heavy methyl or phenyl siloxane oils,
75 per cent petrolatum or equivalent vehicle.

The addition of the heavier greases aids greatly in "sealing off" the wound or affected area of the skin and in holding the plasma in the exposed tissues, thus reducing or obviating the need for pressure bandaging. This composition is also useful in treating and preventing bed sores, since it not only provides the necessary protective coating but possesses the necessary lubricity to prevent the tendency toward further irritation of the skin by friction between the body and external materials.

Since low toxicity is extremely important in this connection, toxic thickening agents such as lithium hydroxide or any of the metallic soaps ordinarily employed as fillers in the formation of conventional silicone greases must be rigorously avoided. Powdered silica functions adequately as a thickening agent and is preferred because of its negligible toxicity factor and chemical inertness.

Tests performed recently by medical personnel of the University of Wisconsin Medical School on the skin protecting salves of the present invention have indicated the remarkable effectiveness of these salves.

According to the report of the testing authorities, the cases shown in the following table are almost without exception failures under currently acceptable and recognized forms of therapy prior to the present invention. In most of the cases shown in the following table the presence of moisture with resulting maceration of the skin and secondary infection was present:

| Type of Case | Number | Cured or Satisfactorily Controlled | Failure |
| --- | --- | --- | --- |
| Colostomy | 11 | 11 | |
| Diaper Rash | 11 | 10 | 1 |
| Decubitus Ulcer | 7 | 7 | |
| Iliostomy | 7 | 7 | |
| Intertrigo | 6 | 6 | |
| Dermatitis Venenata | 5 | 5 | |
| Chapping (Hands, Face) | 2 | 2 | |
| Fissured Lips | 2 | 2 | |
| Pruritus Ani | 2 | 1 | 1 |
| Persistent Diarrhea (Proctitis) | 2 | 2 | |
| Post-Operative Hemorrhoidectomy | 1 | 1 | |
| Small Bowel Fistula | 1 | 1 | |
| Diabetic Gangrene (Adjacent Maceration) | 1 | 1 | |
| Peri-Anal Psoriasis (Associated Maceration) | 1 | 1 | |
| Broncho-pleural-cutaneous Fistula (TBc and Actinomycosis) | 1 | 1 | |
| Cavernostomy | 1 | 1 | |
| | 61 | 59 | 2 |

From the foregoing, it will be apparent that the present invention has provided an extremely effective and versatile skin protecting dressing which represents a truly remarkable advance over substances previously in use for the purpose. Because of its outstanding qualities, the presently disclosed dressings have already won the unqualified approval of medical personnel who have had an opportunity to thoroughly test and use it.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A moisture repellant composition consisting essentially of petrolatum and at least one ingredient selected from the group consisting of methyl siloxanes, ethyl siloxanes and phenyl siloxanes having a viscosity of from about 20 to about 60,000 centistokes.

2. A moisture repellant skin protectant dressing for the treatment of dermatological sequelae of constant contact with moisture consisting of a homogeneous mixture comprising a major portion by volume of petrolatum and a minor proportion by volume of at least one siloxane selected from the group consisting of methyl siloxanes, ethyl siloxanes, and phenyl siloxanes having a viscosity of from about 20 to about 60,000 centistokes.

3. A moisture repellant skin protectant dressing consisting of an unreacted homogeneous mixture of 3 to 45 per cent by volume of at least one material selected from the group consisting of methyl siloxanes, ethyl siloxanes and phenyl siloxanes having a viscosity of from about 20 to about 60,000 centistokes and from 97 to 55 per cent by volume of petroleum.

4. A skin protectant comprising about three volumes of petrolatum and about one volume of a siloxane selected from the group consisting of methyl, ethyl, and phenyl siloxanes.

5. The skin protectant of claim 4 further characterized in that said siloxane comprises a methyl siloxane having a viscosity of about 60,000 centistokes.

6. A skin protectant comprising a vehicle selected from the group consisting of petrolatum, sterile jelly, "Aquaphor," and "Jelene," and having dispersed therein from about 3 to about 45 per cent by volume of a siloxane selected from the group consisting of methyl, ethyl, and phenyl siloxanes, said siloxane having a viscosity within the range of from about 20 to about 60,000 centistokes.

7. The skin protectant dressing of claim 6 further characterized in that powdered silica is dispersed in the siloxane.

References Cited in the file of this patent

UNITED STATES PATENTS

| | | |
|---|---|---|
| 2,258,218 | Rochow | Oct. 7, 1941 |
| 2,428,608 | Bass | Oct. 7, 1947 |
| 2,466,642 | Larson | Apr. 5, 1949 |
| 2,527,793 | Bump | Oct. 31, 1950 |
| 2,584,413 | Baer | Feb. 5, 1952 |

FOREIGN PATENTS

| | | |
|---|---|---|
| 725,945 | Germany | Oct. 2, 1942 |

OTHER REFERENCES

Foster: Journal of the American Pharmaceutical Association, Sc. Ed., vol. 40, Mar. 1951, pgs. 123–125.

U. S. Dispensatory, 24th ed. (1947), pg. 993.

Barondes: Military Surgeon, May 1950, pgs. 379 to 387.

Schoog: Arzneimittel-Forschung, July 1951, pgs. 167 to 169.